United States Patent
Pier et al.

(10) Patent No.: US 6,813,786 B1
(45) Date of Patent: Nov. 9, 2004

(54) POTTY WITH DISPOSABLE LINER DISPENSER

(76) Inventors: Russell W Pier, 2252 Canterbury Cir., Akron, OH (US) 44319; Jennifer K Pier, 2252 Canterbury Cir., Akron, OH (US) 44319

(*) Notice: Subject to any disclaimer, the term of this patent is extended or adjusted under 35 U.S.C. 154(b) by 0 days.

(21) Appl. No.: 10/664,499

(22) Filed: Sep. 19, 2003

(51) Int. Cl.$^7$ .............................................. A47K 11/06
(52) U.S. Cl. ......................................................... 4/484
(58) Field of Search ........................... 4/483, 484, 449, 4/479, 452; 220/495.07

(56) References Cited

U.S. PATENT DOCUMENTS

| | | | |
|---|---|---|---|
| 3,452,368 A | | 7/1969 | Couper .......................... 4/142 |
| 3,619,822 A | | 11/1971 | Carmichael ..................... 4/142 |
| 5,632,401 A | * | 5/1997 | Hurd ...................... 220/495.07 |
| 5,678,723 A | * | 10/1997 | Swift et al. ............. 220/495.07 |
| 5,960,487 A | | 10/1999 | Hawkins et al. ................ 4/449 |
| 6,052,842 A | | 4/2000 | He ................................. 4/484 |
| 6,385,790 B1 | * | 5/2002 | Abraham et al. .............. 4/484 |
| 6,390,323 B1 | * | 5/2002 | Alticosalian ........... 220/495.03 |

\* cited by examiner

*Primary Examiner*—Charles E. Phillips
(74) *Attorney, Agent, or Firm*—Paul E Milliken; Ray L Weber

(57) ABSTRACT

A potty having a disposable liner dispenser comprising: a body member having at least one substantially vertical sidewall defining an interior cavity and having an oval top rim portion and a bottom edge portion adapted to sit on a floor or other horizontal surface, and a bowl portion extending downwardly from the top rim portion into the interior cavity a distance less than the height of the sidewall, the bowl having a bottom with a liner entrance hole therethrough of sufficient size to permit a liner to be drawn upwardly through the hole, a liner dispenser mounted in the interior cavity beneath the bowl, in communication with the liner entrance hole so that liners can be drawn from the liner dispenser and upwardly through the liner entrance hole a sufficient distance that a top portion of the liner can be folded radially outwardly over the top rim portion of the body member with the remainder of the liner conforming generally to the inside contour of the bowl; and a substantially oval seat adapted to be placed on top of the top rim and folded over liner to clamp the liner between the top rim and the seat and hold it in position in the bowl for use. The liner dispenser may contain a fan folded strip of liners or a roll of liners which may be torn off one at a time at perforated lines as needed.

25 Claims, 4 Drawing Sheets

POTTY WITH DISPOSABLE LINER DISPENSER

FIELD OF THE INVENTION

This invention relates to a potty with a supply of portable liners in a dispenser and more particularly to a dispenser mounted beneath a potty bowl having liners which may be sequentially drawn upwardly through a hole in the bottom of the bowl as needed.

BACKGROUND OF THE INVENTION

Potties or portable toilets having various types of liner dispensers are well known in the prior art. Some prior patents show the liners merely being placed individually in the bowl through the top opening. Others show a supply of liners mounted on the outside of the bowl and pulled downwardly from the top and passing out through a hole in the bottom of the bowl.

Some patents shows the liners being pulled sideways into the bowl.

Many of these prior patents show rather complicated mechanical motors and mechanisms for moving the liners in and out of the bowl.

An early patent U.S. Pat. No. 3,452,368 issued to Couper shows a tube of fan folded liners folded in an annular ring around the outside of a bowl like member and pulled over its upper edge and downwardly through the center of the bowl like member and through two sets of opposed rollers which seals the bottoms of each bag and holds it in position for use and then allows the use bag to be pulled from the bottom and advance another section of the tube for use.

Another early patent U.S. Pat. No. 3,619,822, Carmichael, also stores a tube in an annular fan fold configuration around the outside of a bowl and also draws the liner from the top downwardly through the center and through rollers which seal the bottom of each bag. The He patent, U.S. Pat. No. 6,052,842 also draws the flexible tub from the top down through the center of a conical shaped member and out the bottom by means of rollers which seal each individual bag at the ends.

The Hawkins et al patent, U.S. Pat. No. 5,960,487 shows a tube pulled from a vertical roll on one side of the bowl and passed through the bowl and out the opposite side.

Some patents show the use of separate bags rather than a continuous tube which can be torn apart to form individual bags.

The Abraham et al patent, U.S. Pat. No. 6,385,790 B1 uses an inflated seat elevating structure and has a roll of flexible tubing mounted on a roller beneath an annular seat structure. The roll is pulled up through the open bottom beneath the seat to form a liner beneath the seat. When used the liner is pulled out the top and a new one advanced from the roll at the bottom.

SUMMARY OF THE INVENTION

The invention as claimed is a potty having a disposable liner dispenser comprising: a body member having at least one substantially vertical sidewall defining an interior cavity and having an oval top rim portion and a bottom edge portion adapted to sit on a floor or other horizontal surface, and a bowl portion extending downwardly from the top rim portion into the interior cavity a distance less than the height of the sidewall, the bowl having a bottom with a liner entrance hole therethrough of sufficient size to permit a liner to be drawn upwardly through the hole, a liner dispenser mounted in the interior cavity beneath the bowl, in communication with the liner entrance hole so that liners can be drawn from the liner dispenser and upwardly through the liner entrance hole a sufficient distance that a top portion of the liner can be folded radially outwardly over the top rim portion of the body member with the remainder of the liner conforming generally to the inside contour of the bowl; and a substantially oval seat adapted to be placed on top of the top rim and folded over liner to clamp the liner between the top rim and the seat and hold it in position in the bowl for use. The liner dispenser may contain a fan folded strip of liners or a roll of liners which may be torn off one at a time as needed.

DETAILED DESCRIPTION OF THE INVENTION

Figure 1:
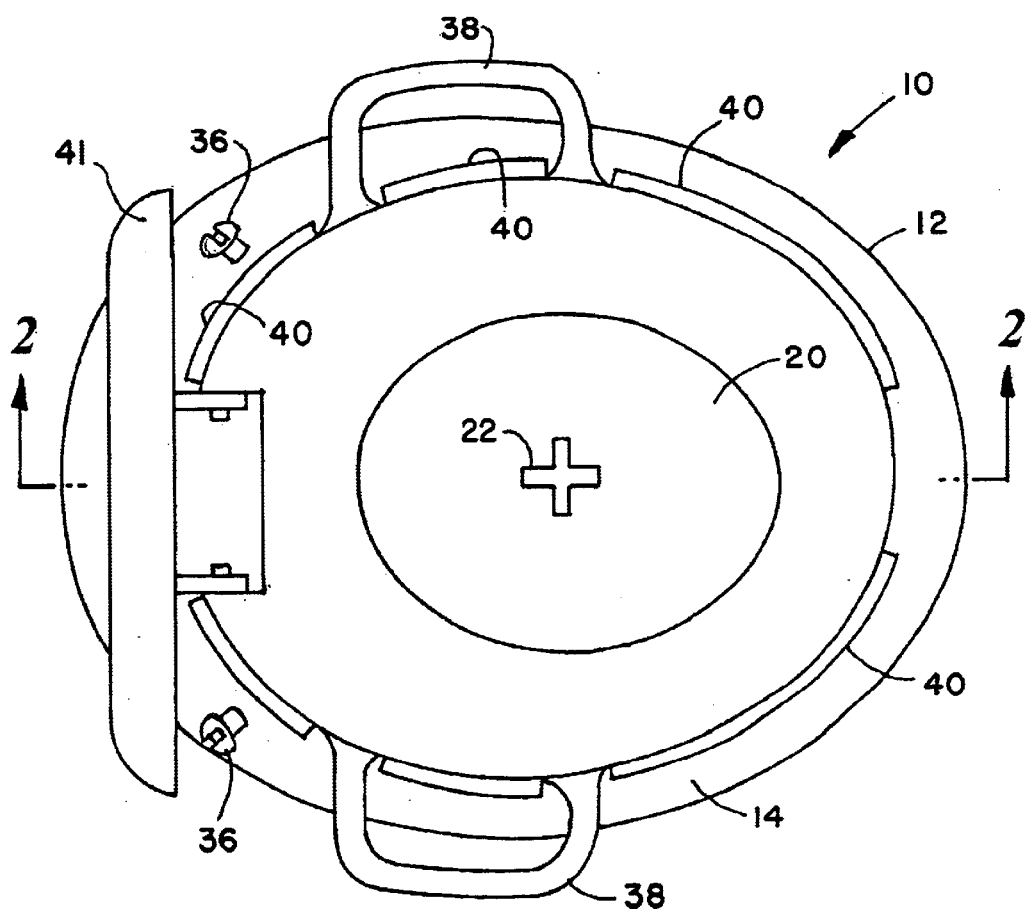
FIG. 1 is a top plan view of the potty of the invention.
Figure 2:
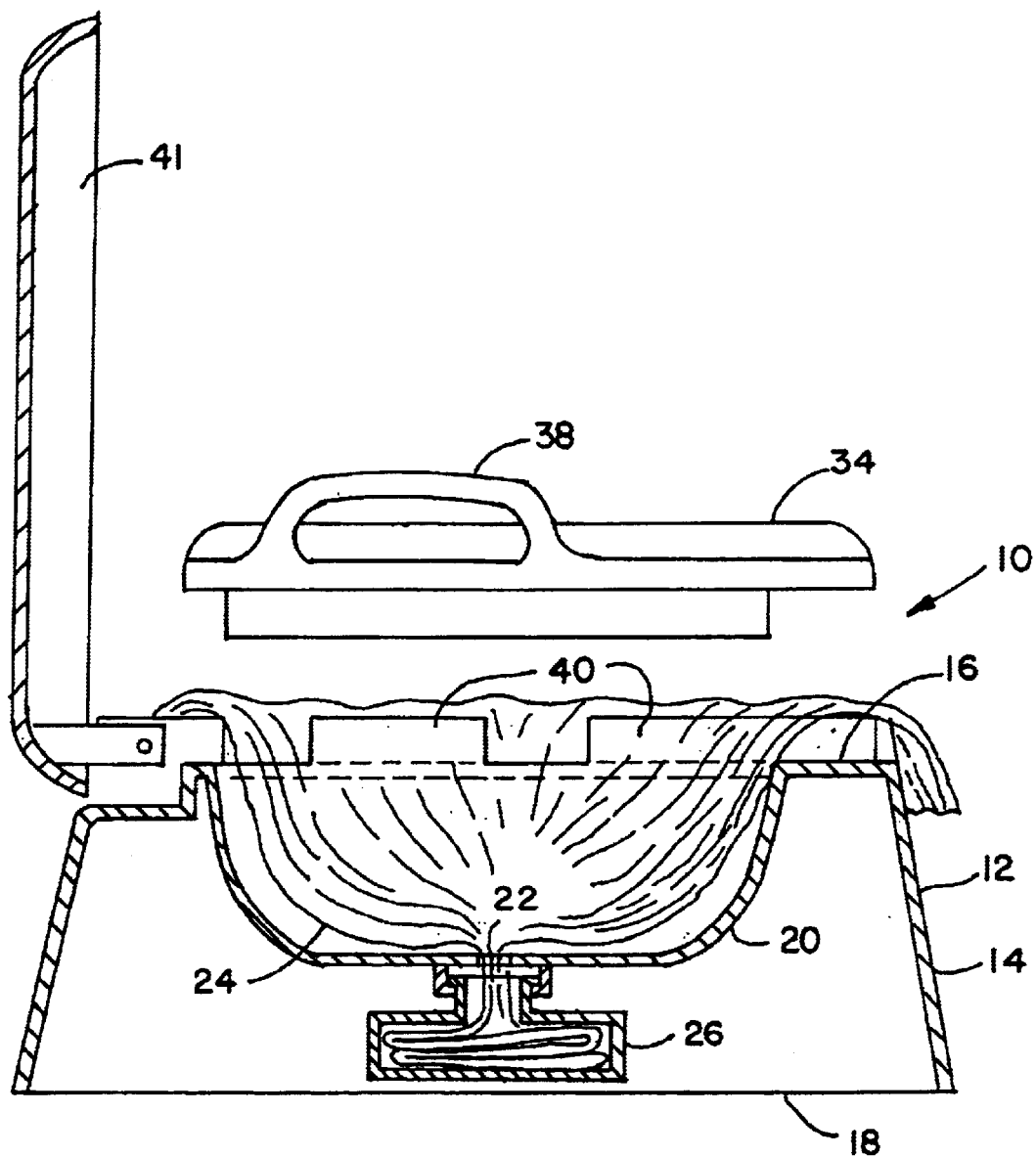
FIG. 2 is a side cross-sectional view taken on line 2—2 of FIG. 1.

Referring now to FIGS. 1 and 2 of the drawings, a potty is indicated generally by the numeral 10. The potty 10 has a body 12 having a substantially vertical sidewall 14 defining and interior cavity, an oval top rim portion 16, and a bottom edge portion 18 adapted to sit on a floor or other horizontal surface, and a bowl portion 20 extending downwardly from the top rim portion 16 into the cavity a distance less than the height of the sidewall. The bowl portion 20 has a cross shaped liner entrance hole 22 of sufficient size to permit a liner bag 24 to be pulled upwardly through the hole 22 and folded radially outwardly over the top rim portion 16 to present an open liner bag which is ready for use within the potty.

Figure 3:
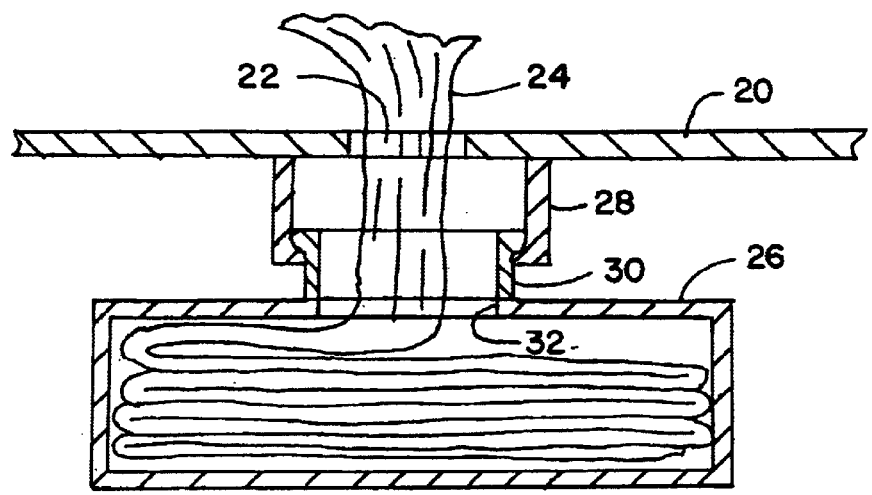
FIG. 3 is an enlarged fragmentary cross-sectional view showing one embodiment of a liner dispenser showing a strip of liners in a fan fold orientation within the dispenser.

A supply of liner bags 24 can be stored in a rectangular dispenser 26 such as is shown in FIGS. 2 and 3. One way of fastening the dispenser 26 to the bottom of the bowl 20 is to provide a downwardly extending collar 28 attached to the bottom of the bowl 20 and an upwardly extending collar 30 attached to the top of the dispenser 26 which is inserted inside the collar 28. The collar 28 has an inwardly facing rib 28a at its lower end and the collar 30 has an outwardly facing rib 30a which snaps past the rib 28a when the collar 30 is inserted inside the collar 28. These ribs 28a and 30a cooperate to lock the collars 28 and 30 together and hold the dispenser 26 securely in position below the bowl 20. The dispenser 26 has a center hole inside the collar 30 which is in alignment with the cross shaped hole 22 in the bottom of the bowl 20. Thus when the dispenser 26 is attached to the bottom of the bowl 20 the liner bags 24 can be pulled one by one upwardly through holes 32 and 22 and into the bowl where the bag is folded radially outwardly over the top rim 16 and an oval seat 34 is placed on top of the rim 16 clamping the folder over portion of the liner bag 24 in an open position for use.

To further aid in retaining the bag 24 in an open position, a plurality of outwardly extending projections 36 such as screws or hooks can be located near the top rim 16 and the bag 24 can be hooked over the projections 36. The seat 34 can have a pair of handles 38 to make it easy to remove or replace the seat 34. A series of upstanding ribs 40 around top rim 16 hold the seat 34 in position and prevent it from sliding when sitting on top of the rim 16.

A hinged lid 41 is attached to the rear portion of the top rim 16 and can be swung down to cover the seat 34 when the potty is not being used. While the various parts of the potty 10 can be made from a number of different materials, molded plastic is a good choice from the standpoint of ease of production.

With regard to the dispenser 26, it is a rectangular box shaped container which has one end open for loading it with a supply of fan fold liner bags 24 which can be in a continuous strip with perforated transverse lines between each bag which is well known in the art of plastic bags to enable the bags to be torn apart when used. The collars 28 and 30 are shown as round however they could be square or other shapes.

Figure 4:
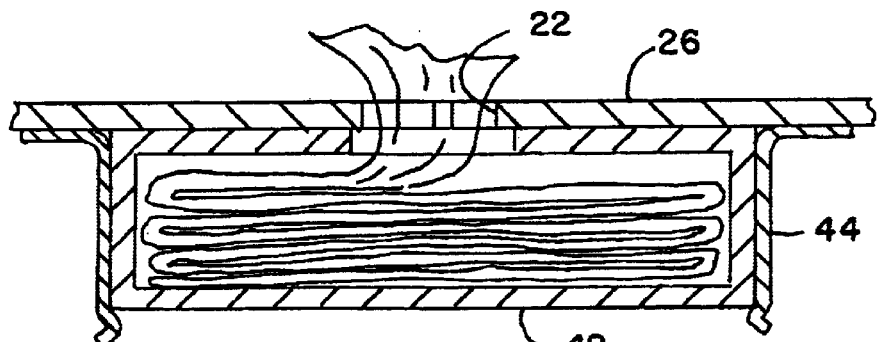
FIG. 4 is an enlarged fragmentary cross-sectional view showing another method of fastening a dispenser to the bottom of a potty bowl.

Instead of fastening the dispenser with the above described collars 28 and 30, it could also be attached to the bottom of the bowl 20 by other means such as shown in FIG. 4 where a dispenser 42 is held against the bottom of the bowl 20 with spring clips 44. Elastic bands or other means can also be used to hold the dispenser in place.

Figure 5:
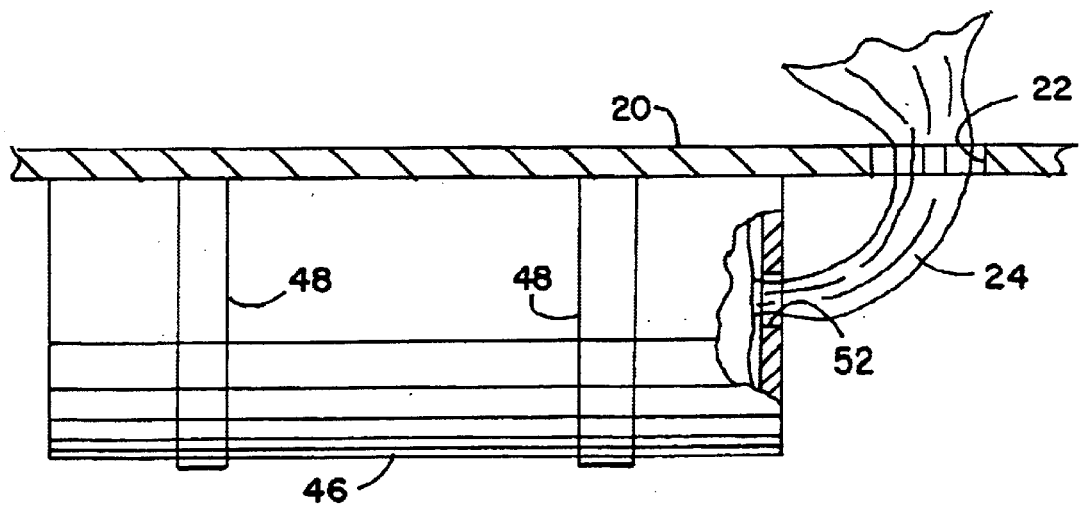
FIG. 5 is an enlarged fragmentary cross-sectional view showing another embodiment of liner dispenser in which a roll of liners are withdrawn from the end of a cylindrical container.

Referring now to FIG. 5, a cylindrical dispenser 46 is held in position against the bottom of the bowl 20 by a plurality of spring clips 48. One end 50 of the dispenser 46 has an exit hole 52 through which the bags 24 can be pulled and fed into the inlet hole 22 so it can be pulled up into the bowl 20. The opposite end of the dispenser 46 can be left open for replacing rolls of liner bags 24 or it can be covered with a removable cap (not shown).

Figure 6:
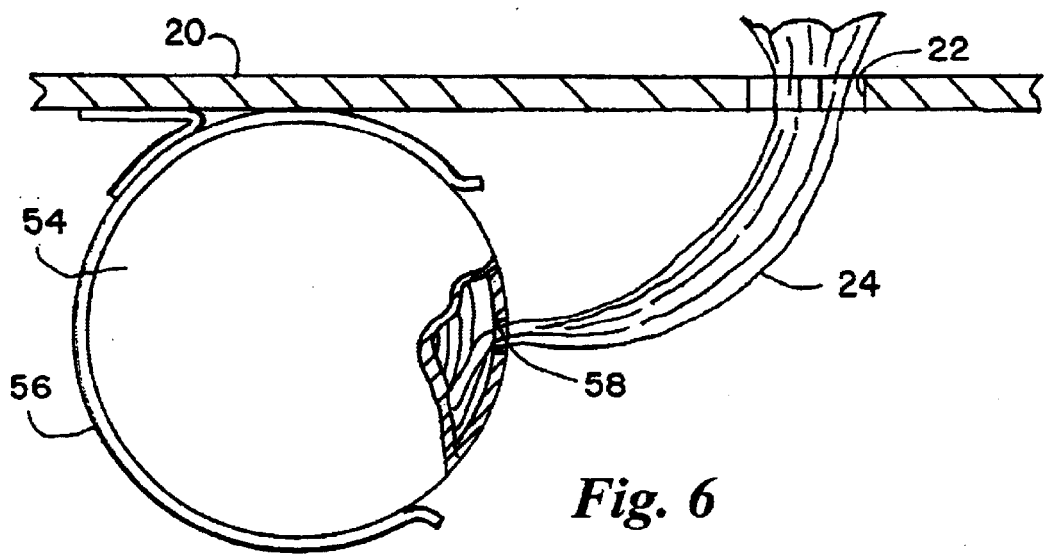
FIG. 6 is an enlarged fragmentary cross-sectional view showing another embodiment of liner dispenser in which a roll of liners are withdrawn from an axially extending slot in the side of a cylindrical container.
Figure 7:
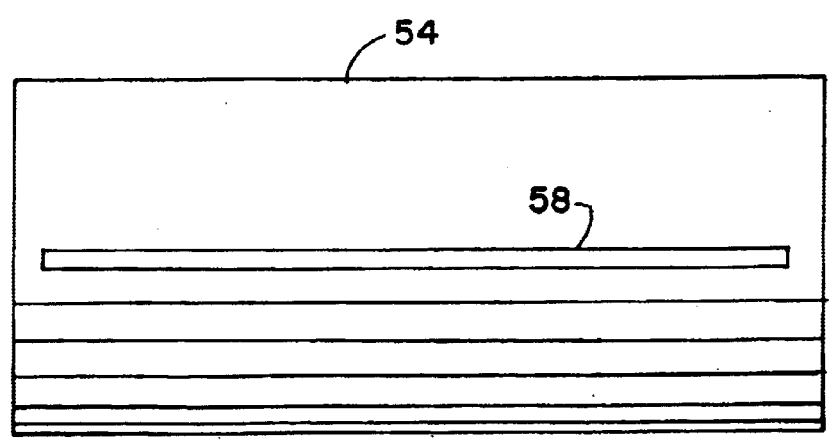
FIG. 7 is a side view of the cylindrical container shown in FIG. 6.

As an alternative to pulling the bags 24 from the end of the dispenser 46, FIGS. 6 and 7 show a cylindrical dispenser 54 attached to the bowl 20 with a plurality of spring clips 56. The dispenser 54 has an axial slot 58 extending substantially the full length of the dispenser and permitting liner bags 24 to be pulled out from the slot and fed into in inlet hole 22 and pulled up into the bowl 20 in the same manner as previously described in the other embodiments.

Thus it can be seen that there are various shapes of dispensers that may be used depending upon whether the supply of liner bags are mounted in a fan fold configuration or a circular roll and there are various ways that the dispenser may be attached below the bottom of the bowl either to the bowl or to the side wall of the potty body. While the inlet hole in the bottom of the bowl is shown as cross shaped, it can be round or other shapes without departing from the scope of the invention.

The supply of plastic liner bags can be placed directly in the dispenser as shown in the drawings or a package of bags can be inserted into the dispenser.

It should also be noted that the invention is not limited to the shape of the body of the potty illustrated in the drawings since it is obvious that the invention is not directed to the shape of the body but to how the liners are dispensed into the bowl and attached to the body of the potty to provide an open liner bag for use. These and various other modifications may be made without departing from the scope of the invention.

What is claimed is:

1. A potty having a disposable liner dispenser comprising:
   a body member having an oval substantially vertical sidewall defining an interior cavity and having an oval top rim portion and a bottom edge portion adapted to sit on a floor or other horizontal surface, and a bowl portion extending downwardly from the top rim portion into the interior cavity a distance less than the height of the sidewall, the bowl having a bottom with a liner entrance hole therethrough of sufficient size to permit a liner to be drawn upwardly through the hole;
   a liner dispenser attached to the body member in the interior cavity beneath the bowl, in communication with the liner entrance hole so that liners can be drawn from the liner dispenser and upwardly through the liner entrance hole a sufficient distance that a top portion of the liner can be folded radially outwardly over the top rim portion of the body member; and
   a substantially oval seat adapted to be placed on top of the top rim and folded over liner to clamp the liner between the top rim and the seat and hold it in position in the bowl for use.

2. A potty as claimed in claim 1 wherein the dispenser is a rectangular box containing a supply of fan folded liner bags which may be individually drawn upwardly through the liner entrance hole in the bowl as needed for use.

3. A potty as claimed in claim 2 including mean to removeably attach the dispenser to the bottom of the bowl beneath the liner entrance hole.

4. A potty as claimed in claim 3 wherein the means to removeably attach the dispenser to the bottom of the bowl is a plurality of spring clips extending downwardly from the bottom of the bowl and engaging sides of the dispenser.

5. A potty as claimed in claim 3 wherein the bottom of the bowl has a downwardly extending collar surrounding the liner entrance hole and the dispenser has an upwardly extending collar removeably attachable to the downwardly extending collar and surrounding an exit hole which is aligned with the liner entrance hole when the two collars are attached together so that liners can be pulled from the dispenser through the exit hole and the liner entrance hole in the bowl and put in an operative position within the bowl.

6. A potty as claimed in claim 5 wherein the collars are round.

7. A potty as claimed in claim 5 wherein the collars have ribs which snap together when one of the collars is moved over the other to attach the dispenser to the bowl.

8. A potty as claimed in claim 1 wherein the dispenser is a cylindrical container attached beneath the bowl and having a roll of liner bags therein which may be individually drawn upwardly through the liner entrance hole in the bowl as needed for use.

9. A potty as claimed in claim 8 wherein the cylindrical container has an exit opening at one end thereof from which liners can be withdrawn and pulled upwardly through the liner entrance in the bottom of the bowl and positioned in the bowl for use.

10. A potty as claimed in claim 8 wherein the cylindrical container has an elongated axially extending exit slot through which the liners can be withdrawn, then drawn upwardly through the liner entrance in the bottom of the bowl and positioned in the bowl for use.

11. A potty as claimed in claim 1 including a plurality of outwardly projecting members near the top rim portion of the body member to aid in retaining the liner is the operative position.

12. A potty as claimed in claim 1 including a lid which can be opened and closed covering the seat.

13. A potty having a disposable liner dispenser comprising:
- a body member having at least one substantially vertical sidewall extending around and defining an interior cavity and having an oval top rim portion and a bottom edge portion adapted to sit on a floor or other horizontal surface, and a bowl portion extending downwardly from the top rim portion into the interior cavity a distance less than the height of the sidewall, the bowl having a bottom with a liner entrance hole therethrough of sufficient size to permit a liner to be drawn upwardly through the hole;
- a liner dispenser mounted in the interior cavity beneath the bowl, in communication with the liner entrance hole so that liners can be drawn from the liner dispenser and upwardly through the liner entrance hole a sufficient distance that a top portion of the liner can be folded radially outwardly over the top rim portion of the body member with the remainder of the liner conforming generally to the inside contour of the bowl; and
- a substantially oval seat adapted to be placed on top of the top rim and folded over liner to clamp the liner between the top rim and the seat and hold it in position in the bowl for use.

14. A potty as claimed in claim 13 wherein the dispenser is a rectangular box containing a supply of fan folded liner bags which may be individually drawn upwardly through the liner entrance hole in the bowl as needed for use.

15. A potty as claimed in claim 14 wherein the dispenser is removeably attached to the bottom of the bowl beneath the liner entrance hole.

16. A potty as claimed in claim 15 wherein the means to removeably attach the dispenser to the bottom of the bowl is a plurality of spring clips extending downwardly from the bottom of the bowl and engaging sides of the dispenser.

17. A potty as claimed in claim 15 wherein the bottom of the bowl has a downwardly extending collar surrounding the liner entrance hole and the dispenser has an upwardly extending collar removeably attachable to the dowardly extending collar and surrounding an exit hole which is aligned with the liner entrance hole when the two collars are attached together so that liners can be pulled from the dispenser through the exit hole and the liner entrance hole in the bowl and put in an operative position within the bowl.

18. A potty as claimed in claim 17 wherein the collars are round.

19. A potty as claimed in claim 13 wherein the collars have annular ribs which snap together when one of the collars is moved over the other to attach the dispenser to the bowl.

20. A potty as claimed in claim 13 wherein the dispenser is a cylindrical container attached beneath the bowl and having a roll of liner bags therein which may be individually drawn upwardly through the liner entrance hole in the bowl as needed for use.

21. A potty as claimed in claim 20 wherein the cylindrical container has an exit opening at one end thereof from which liners can be withdrawn and pulled upwardly through the liner entrance in the bottom of the bowl and positioned in the bowl for use.

22. A potty as claimed in claim 20 wherein the cylindrical container has an elongated axially extending exit slot through which the liners can be withdrawn, then drawn upwardly through the liner entrance in the bottom of the bowl and positioned in the bowl for use.

23. A potty as claimed in claim 13 including a plurality of outwardly projecting members near the top rim portion of the body member to aid in retaining the liner is the operative position.

24. A potty as claimed in claim 13 including a lid which can be opened and closed covering the seat.

25. A potty as claimed in claim 13 wherein the liners are thin plastic bags in a continuous strip with transverse perforations to permit a bag to be torn from the strip when it has been used and replaced by pulling an unused bag through the liner entrance bole and into operative position in the bowl.

* * * * *